Sept. 12, 1933.  E. C. MOGFORD ET AL  1,926,346
AXLE
Filed Nov. 22, 1929
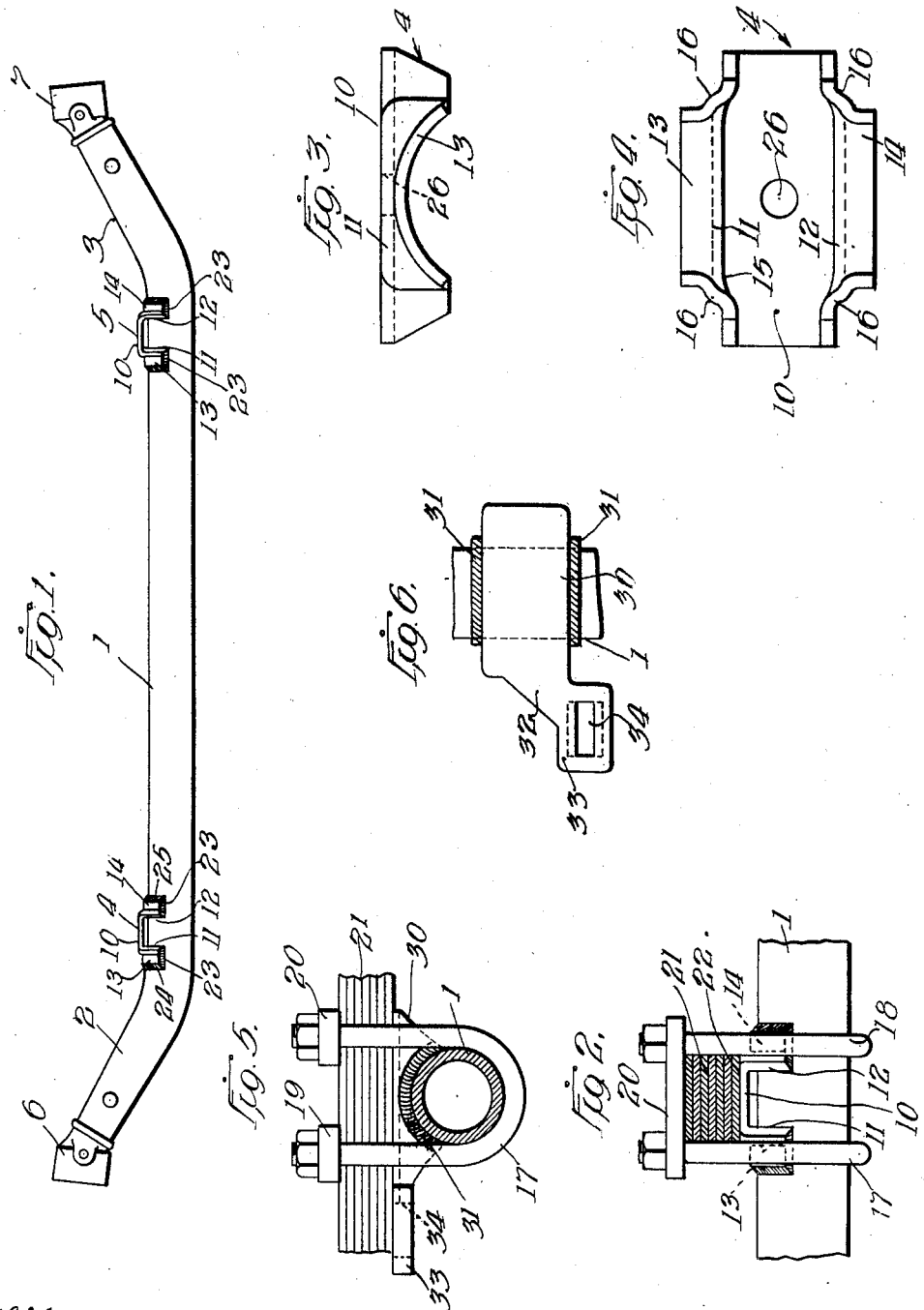
Witnesses:
Harry R. L. White
Robt. Cremer
Inventors:
Edmund C. Mogford
George Spatta
By Brown Jackson Boettcher Dienner
Attys.

Patented Sept. 12, 1933

1,926,346

UNITED STATES PATENT OFFICE 1,926,346

AXLE

Edmund C. Mogford and George Spatta, Buchanan, Mich., assignors to Clark Equipment Company, Buchanan, Mich., a corporation of Michigan Application November 22, 1929
Serial No. 409,095

7 Claims. (Cl. 267—52)

Our invention relates to tubular front axles for automobiles and similar vehicles, and more particularly it relates to an improved spring seat for axles of this kind.

Tubular axles are known in the prior art, having gained favor particularly as front axles in automotive equipment with a considerable saving in weight of the front axle without sacrificing its strength and resistance to bending. As will be appreciated by those skilled in the art, this saving in weight is decidedly advantageous, since the axle is unsprung. In our co-pending application, Serial No. 363,362, filed May 15, 1928, of which co-pending application the present application is a division, we disclose an improved tubular front axle on which were mounted an improved spring seat, which spring seat forms the subject matter of the instant application.

In the disclosure of this co-pending application the axle comprises a seamless steel tubing formed to the requisite shape of the reverse Elliott type of axle and provided with end yokes forged to the required shape and welded into the tapered ends of the tubular axle itself. We also disclose a spring seat or pad which is constructed of sheet metal pressed into the desired shape, a construction which affords a considerable saving in weight over the forged spring seats that have heretofore been used on axles of this kind. Although the spring seat in the preferred embodiment of our invention is a sheet metal stamping, a forged spring seat may be substituted therefor within the teachings of our invention.

Now, to acquaint those skilled in the art with the teachings of our invention, reference is made to the accompanying drawing, in which a preferred embodiment of it is shown by way of example only.

In the drawing:

Fig. 1 is a side view of a completed axle;

Fig. 2 is a fragmentary view showing the manner of attaching the springs to the spring seat;

Fig. 3 is a side view of the pressed metal spring seat;

Fig. 4 is a bottom plan view of the pressed metal spring seat;

Fig. 5 is a fragmentary side view of a modified form of spring seat and shock absorber hanger; and Fig. 6 is a plan view of the modified seat shown in Fig. 5.

Referring now to the drawing more in detail, the axle comprises the tubular member 1, on the opposite ends of which are formed the upturned arms 2 and 3, this forming being preferably performed in the manner pointed out in our above mentioned co-pending application to thicken that portion of the walls of the tube 1 disposed in the arms 2 and 3, with the thickened walls extending beneath the point at which the spring seats 4 and 5 are attached. The yoke pieces 6 and 7 are suitably fastened into the open end of the arms 2 and 3, and serve as pivotal support for the wheel spindles, as will be understood.

The spring pads 4 and 5 are shown in more detail in Figs. 3 and 4 and are preferably made of pressed sheet metal or plate stock and comprise a flat platform portion 10 which is disposed above the axle 1 and upon which the lower leaf 11 of the spring 12 rests. The platform portion 10 of the spring seat is provided with substantially parallel walls 11 and 12 formed at substantially right angles to the plane of the platform 10. The bottom of these walls 11 and 12 are formed to the contour of the cylindrical axle 1, and feet 13 and 14 are projected outward from the wall substantially at right angles to it. These feet are also formed to register with the cylindrical surface of the axle.

The portions of the platform 10 fore and aft of the axle are preferably slightly narrower than the central portion 15, forming corners 16 in which the U-bolts 17 and 18 are adapted to lie. These U-bolts encircle the tubular axle 1 and project through yokes 19 and 20, which are formed to space the upper ends of the bolts apart a distance equal to the width of the projecting ends of the platform 10.

The springs 21 are disposed on the platform, and with the bottom leaf 22 in intimate contact therewith and the U-bolts 17 and 18 are disposed on opposite sides of the springs. The feet 13 and 14 of the spring seat 10 lie between the U-bolts, so that when the nuts are tightened down the spring, seat, and bolts are firmly gripped upon the axle.

In attaching the spring seat to the axle, the axle and clips or seats are held in a jig and the ends 23 (Fig. 1) of the circular feet 13 and 14 are welded to the axle by hand welding, and then the feet 13 and 14 and their lateral edges 24 and 25 are welded to the axle preferably by machine welding, although, if desired, this also may be done by hand welding.

The platform 10 of the spring seat is provided with a central perforation 26 into which the head of the bolt employed to hold the spring assembly together is inserted, this insertion serving to center the spring properly upon the seat and to assist in preventing movement of the spring assembly with respect to the seat.

In Figs. 5 and 6, we have shown a modified form of spring seat in which the spring seat is formed of a forging. In this case, since the bottom 30 is a solid cylindrical surface, extended wings or seats are not required and a weld 31 at the ends of the bottom serves to rigidly attach the seats to the tubular axle 1. The weld 31 lies over the top portion of the axle 1, forming a fillet in the corner between the vertical wall of the seat member and the axle.

This fillet does not interfere with the locating of the U-bolts 17 and 18 and, since the ends of the spring seat are vertical, they can embrace a larger portion of the circumferential surface of the axle without interfering with the locating of the U-bolt in any way.

Since the spring seat 30 is formed of a forging, it may be provided with a projecting arm 32 forming a shackle 33 for attaching the strap of a shock absorber or rebound check, such shackle having an eye 34 or being otherwise formed to receive the end of a strap or of a cable which may be employed for this purpose. If a two-way shock absorber is to be employed the arm 32 may bear a pin or the like connection for the shock absorber.

In the preferred manner of constructing the axle as set forth in our above mentioned copending application, the spring seats are welded onto the axle after it has been finally formed into shape. The welding of the seats 4 and 5 to the body of the axle provides a hold which is highly resistant to any torsional stresses as well as to other stresses which are imposed upon the axle incidental to its use.

We do not intend to be limited to the details shown and described.

We claim:

1. A spring seat comprising a flat perforated plate, a pair of parallel walls disposed on opposite sides of said plate at substantially right angles to it, the bottom edges of said walls defining arcs of a circle whose center lies equidistant from the ends of the plate, and feet formed outward from said walls on their edges at substantially right angles to the walls.

2. A spring seat comprising a flat substantially rectangular plate, a pair of parallel walls disposed on opposite sides of said plate at right angles to it, each wall having a height substantially equal to the thickness of the plate at the center of the plate which height increases as the ends of the plate are approached so that the bottom edge of the wall describes an arc of a circle, and a foot projecting from each wall at right angles to it along said bottom edge.

3. The combination with an axle, of a pressed metal spring clip for seating a spring assembly upon the axle, comprising a substantially flat rectangular platform portion and laterally extending wings, said wings terminating in flanges shaped to fit against the axle, said flanges being welded to the axle to rigidly attach the clip to the axle.

4. The combination with a tubular axle, of a pressed metal spring clip comprising a flat platform, flanged lateral extensions of said platform engaging and welded to the axle, said flanged extensions subtending a chord less than the diameter of the axle, and U-bolts encircling the axle with their straight sides tangential thereto and abutted against the ends of said flanged extensions.

5. The combination with a cylindrical axle and a spring assembly, of a spring seat comprising a flat perforated platform engaging the spring and spaced from the axle by parallel walls which terminate at their free ends in flanges shaped to engage the axle, said flanges being welded to the axle, and a pair of U-bolts encircling the axle and clamping the spring thereon, said bolts engaging the ends of said flanges to cause said U-bolts to aid said welds in resisting forces tending to turn said spring around the axis of said axle.

6. A metal spring clip comprising a substantially flat formed portion and laterally extending wings, said wings comprising cylindrically formed flanges having the same radius of curvature and extending away from each other, parallel legged U-bolts for securing said wings in place, the peripheral extent of said flanges being sufficiently less than a semicircle to provide for parallel tangency of the legs of the bolts to the cylinder defined by said flanges.

7. The combination with an axle, of a metal spring clip for seating a spring assembly upon the axle, comprising a substantially flat rectangular supporting platform and laterally extending curved wings shaped to fit against said axle and welded thereto, parallel legged U-bolts embracing said wings and axle, said wings being of such peripheral extent as to provide for parallel tangency to said axle by the opposite legs of the bolts.

EDMUND C. MOGFORD.
GEORGE SPATTA.